United States Patent
Manohar et al.

(10) Patent No.: US 9,639,310 B2
(45) Date of Patent: May 2, 2017

(54) OPTIMAL SCHEDULING OF MULTI-SITE ENTERPRISE PRINT JOBS

(71) Applicant: XEROX CORPORATION, Norwalk, CT (US)

(72) Inventors: Pallavi Madhusudan Manohar, Thane (IN); Eric Michael Gross, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/503,990

(22) Filed: Oct. 1, 2014

(65) Prior Publication Data

US 2016/0098231 A1    Apr. 7, 2016

(51) Int. Cl.
G06F 3/12 (2006.01)
G06Q 50/10 (2012.01)
G06Q 10/06 (2012.01)
G06Q 30/02 (2012.01)

(52) U.S. Cl.
CPC ............ G06F 3/126 (2013.01); G06F 3/1212 (2013.01); G06F 3/1288 (2013.01); G06Q 10/0639 (2013.01); G06Q 10/06313 (2013.01); G06Q 30/0283 (2013.01); G06Q 50/10 (2013.01); G06F 3/1273 (2013.01)

(58) Field of Classification Search
CPC ...... G06F 3/126; G06F 3/1212; G06F 3/1273; G06F 3/1296; G06Q 10/06313; G06Q 10/0639; G06Q 30/0283; G06Q 50/10
See application file for complete search history.

(56) References Cited

U.S. PATENT DOCUMENTS

| | | | |
|---|---|---|---|
| 5,826,270 A | 10/1998 | Rutkowski et al. | |
| 5,978,560 A | 11/1999 | Tan et al. | |
| 6,078,906 A | 6/2000 | Huberman | |
| 7,042,585 B1 | 5/2006 | Whitmarsh et al. | |
| 7,210,407 B2 | 5/2007 | Silverbrook et al. | |
| 7,216,347 B1 | 5/2007 | Harrison et al. | |
| 7,242,490 B1 | 7/2007 | Palmer et al. | |
| 7,626,717 B2 | 12/2009 | Rai et al. | |
| 8,127,012 B2 | 2/2012 | Rai | |
| 8,521,606 B2 | 8/2013 | Purohit et al. | |
| 2002/0071134 A1* | 6/2002 | Jackson | G06F 3/1217 358/1.13 |
| 2003/0128384 A1 | 7/2003 | Nelson et al. | |
| 2003/0182137 A1 | 9/2003 | Whitmarsh et al. | |

(Continued)

*Primary Examiner* — Henok A Shiferaw
(74) *Attorney, Agent, or Firm* — Gibb & Riley, LLC

(57) ABSTRACT

Methods and systems evaluate the most recent print job processed with different printing sites to calculate the current residual capacity for each of the different printing sites. The current residual capacity is determined and maintained by a computerized server. These methods and systems can then calculate the turnaround time of a print job for each of the different printing sites based on the current residual capacity, can calculate the cost of the print job for each of the different printing sites based on historical cost information maintained by the computerized server, and can calculate a weighted sum of the turnaround time and cost of the print job for each of the different printing sites. This allows these methods and systems to select one of the different printing sites based on the relatively lowest weighted sum for the print job, and to assign the print job to the selected printing site.

15 Claims, 3 Drawing Sheets

(56) References Cited

U.S. PATENT DOCUMENTS

| | | |
|---|---|---|
| 2004/0008371 A1 | 1/2004 | Keane et al. |
| 2004/0136028 A1 | 7/2004 | Rabb |
| 2005/0068562 A1 | 3/2005 | Ferlitsch |
| 2005/0141023 A1 | 6/2005 | Yagita et al. |
| 2006/0050294 A1 | 3/2006 | Smith et al. |
| 2007/0019228 A1* | 1/2007 | Rai ................... G06F 3/1214 358/1.15 |
| 2009/0021773 A1 | 1/2009 | Rai |
| 2009/0199734 A1 | 8/2009 | Vered |
| 2010/0007910 A1* | 1/2010 | Martin ................ G06F 3/1211 358/1.15 |
| 2011/0261390 A1* | 10/2011 | Ray ................... G06F 3/1217 358/1.15 |
| 2012/0158533 A1* | 6/2012 | Purohit et al. ............ 705/26.2 |
| 2012/0239525 A1 | 9/2012 | Zeng et al. |

* cited by examiner

OPTIMAL SCHEDULING OF MULTI-SITE ENTERPRISE PRINT JOBS

BACKGROUND

Systems and methods herein generally relate to enterprise printing systems, where one of multiple sites can be selected for the printing of an input print job.

Determining an optimal shop to execute a customer job request is a challenge for an enterprise with shops located at multiple sites. The determination of the "best" processing center or print shop to assign the job should be completed in almost real time (for example, under ~1 minute). The enterprise typically has a large number of production sites along with geography and business constraints on routing the jobs. Therefore, routing the incoming jobs to production sites in a timely manner and devising a method for such routing/scheduling of jobs is a difficult problem.

SUMMARY

Exemplary methods herein process and print a print job by evaluating the most recent print job processed with different printing sites to calculate the current residual capacity for each of the different printing sites. The current residual capacity is based on the assignment time and the completion time of the most recent print job processed by each of the different printing sites. The current residual capacity is determined and maintained by a computerized server that is in communication with and separate from the different printing sites, and does not need to rely upon feedback from the different printing sites themselves.

Further, when evaluating the most recent print job processed with the different printing sites, the methods herein can calculate multiple current residual capacities for each of the different printing sites to account for different sizes, types, and complexities of different most recent jobs processed by the different printing sites.

Such methods then receive a print job into the computerized server after calculating the current residual capacity. These methods can then calculate a turnaround time of the print job for each of the different printing sites, based on the current residual capacity. The methods can also calculate the cost of the print job for each of the different printing sites based on historical cost information maintained by the computerized server (and the historical cost information can be received periodically by the computerized server from the different printing sites). Then, the methods calculate a weighted sum of the turnaround time and the cost of the print job for each of the different printing sites.

In one example, the weighted sum can be calculated by receiving preferences from users supplying the print job, and determining weighting factors based on the preferences. Such methods thus apply the weighting factors to the turnaround time and the cost of the print job for each of the different printing sites to produce a weighted turnaround time and weighted cost of the print job for each of the different printing sites. Then, the weighted turnaround time and the weighted cost of the print job are summed for each of the different printing sites to generate the weighted sum of the turnaround time and the cost of the print job for each of the different printing sites.

This allows these methods to select one of the different printing sites based on which of the different printing sites has the relatively lowest weighted sum for the print job, and to assign the print job to the selected printing site to cause the selected printing site to process the print job using specialized printing and finishing machines. Some methods herein can receive a required turnaround time for the print job, and this limits the selected printing site to one that has a turnaround time that meets the required turnaround time.

Various systems for processing and printing a print job include a computerized server in communication with different printing sites. The different printing sites have specialized printing and finishing machines located in separate locations and in locations that are separate from the computerized server. The computerized server evaluates the most recent print job processed with the different printing sites to calculate the current residual capacity for each of the different printing sites. The current residual capacity is based on the assignment time and the completion time of the most recent print job by the different printing site.

Further, when evaluating the most recent print job processed with the different printing sites, the computerized server can calculate multiple current residual capacities for each of the different printing sites to account for different sizes, types, and complexities of different most recent jobs processed by the different printing sites.

The computerized server receives a print job after calculating the current residual capacity, and then calculates a turnaround time of the print job for each of the different printing sites based on the current residual capacity. The computerized server also calculates the cost of the print job for each of the different printing sites based on historical cost information maintained by the computerized server. The computerized server then calculates a weighted sum of the turnaround time and the cost of the print job for each of the different printing sites.

In one example, the weighted sum can be calculated by receiving preferences from users supplying the print job, and determining weighting factors based on the preferences. The computerized server thus applies the weighting factors to the turnaround time and the cost of the print job for each of the different printing sites to produce a weighted turnaround time and weighted cost of the print job for each of the different printing sites. Then, the weighted turnaround time and the weighted cost of the print job are summed for each of the different printing sites to generate the weighted sum of the turnaround time and the cost of the print job for each of the different printing sites.

This allows the computerized server to select the printing site having the relatively lowest weighted sum for the print job as the selected printing site. The computerized server can also receive a required turnaround time for the print job, and limit the selected printing site to ones having a turnaround time that meets the required turnaround time. The computerized server then assigns the print job to the selected printing site to cause the selected printing site to process the print job using the specialized printing and finishing machines.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
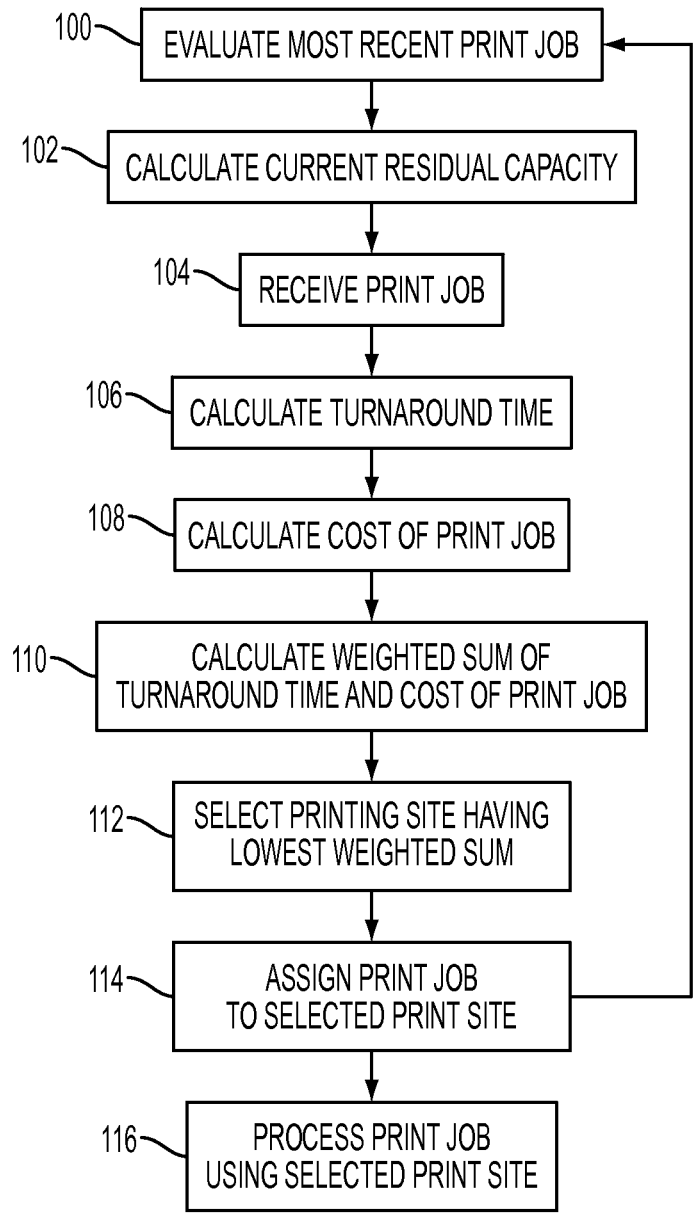
FIG. 1 is a flow diagram of various methods herein.

As mentioned above, routing incoming print jobs to production sites in a timely manner and devising a method for such a routing/scheduling of jobs is a difficult problem. In view of this, methods and systems herein provide an automated and dynamic assignment of print jobs to shops that uses a heuristic for routing/scheduling of jobs for an enterprise with multi-site print shops.

More specifically, the methods and systems herein assign incoming jobs (potentially via a web interface) at the enterprise router to the production site. This approach uses, for example, a cost model for processing each job at each shop and a model for computation of turnaround time (TAT) for each job at each shop. The systems and methods herein consider a weighted sum of cost and turnaround time and assign the job to the shop with lowest sum.

One feature of the systems and methods herein is that residual capacity (RC) of each shop is updated to the central router in real time after every job assignment, and is used for turnaround time computation. Thus, these methods provide a balanced distribution of jobs (and hence minimal number of late jobs). It is difficult to obtain feedback from shops in real time. Thus, the systems and methods herein track the activities of print production sites at the router itself, and use such historical tracking in place of actual feedback from production sites.

When a print job arrives at an order point (enterprise router) via web interface (i.e., with no cost), the systems and methods herein determine to which processing/production center the job should be routed. The approach is to optimize customer "convenience" (job turnaround time including shipping), and enterprise profitability (monetary cost, balanced utilization of all processing centers etc.).

Specifically, print jobs arrive at the enterprise router and form a queue which is served as for example, FCFS (first-come first-served), least-turnaround time job first, etc. Here the systems and methods are routing a job at a time to the best shop with respect to turnaround time and profit (monetary cost). Additionally, enterprise profitability can be more involved, and include balancing utilization across shops, revenue maximization, etc.

In one example, the description of an incoming job (j) can include job size ($S_j$), expected ($TAT_j$) and customer location ($L_j$). A shop is described by cost, turnaround time of processing the job j arrived (and to be routed) at time t. The systems and methods herein can use basic or highly complex models for cost, and turnaround time as follows.

In an example of a cost model, the systems and methods herein can consider cost as a function of three paradigms. Equipment cost incurred for job j at shop s, can be given by $CE_s = S_j * C_{s1}$, where, $C_s$ is the equipment cost at the shop s per unit size of the job. Labor cost which can be based on the geographic location (e.g., NY might be costlier than Canada), $CG_s$. Shipping cost can depends on the proximity of the shop s to the customer location ($L_j$), $CP_s$. Thus, cost of routing the job j to shop s at time t is $C_j^s = CE_s + CG_s + CP_s$. This function can be further enhanced using techniques like weighted sum. The labor cost and the shipping cost can be obtained via a look-up table, for example. The labor cost can be written as a function of job size or required job time. Shipping cost also can be written as a function job size/volume. Those ordinarily skilled in the art would understand that these are only exemplary costs, and that many other cost elements and cost models could be used with the systems and methods herein.

In an example of a turnaround time model, the systems and methods herein can consider turnaround time for a job j at a shop s, $(TAT)_j^s$ can be a function of job size $S_j$ and the Residual Capacity (RC) of the shop. Those ordinarily skilled in the art would understand that these are only exemplary turnaround time elements, and that many other turnaround time elements and models could be used with the systems and methods herein.

Here, RC represents in some sense utilization or load of a shop. Thus, RC is a feedback variable. The systems and methods herein compute RC at the router using knowledge of past assignments of the jobs to a shop. Specifically, the systems and methods herein can update a residual capacity matrix at regular intervals and the systems and methods herein can assume that these intervals are approximately the same as the job inter-arrival time intervals. Further, turnaround time can also be a function of proximity of the customer location with respect to the shop location due to job shipping time. Thus, turnaround time can, in one example, be obtained as follows.

$$(TAT)_j^s = \frac{S_j}{m*(RC)_t^s} + (T_{ship})_j^s$$

Where, m is equipment processing rate per unit time and $(RC)_t^s$ is RC of shop s at time t.

The systems and methods herein compute RC based on prior job assignments and job completions. At the router, the systems and methods herein have knowledge of job assignments to a shop s prior to time t (in one example, assuming all shops start with zero load or known load). However, the systems and methods herein can also estimate job completions prior to time t. Some examples use takt rate (takt rate is defined as the production rate needed to satisfy customer demand) to obtain an approximate estimate of turnaround time. In one example, the systems and methods herein can use relative turnaround time estimates across shops. In some situations, the systems and methods herein can assume that only a single workflow exists (i.e., essentially a single type of job is considered); however, this can be extended to multiple job types by computing RC for each type of job separately.

In this example, the rate at which job gets done can be takt rate per unit time (same as update time), and the maximum takt rate allowed can be limited by the equipment rate m. Then, the number of jobs in the shop=(waiting jobs+new jobs assigned)−completed jobs (using takt rate). The number of jobs (or total size of jobs) essentially represents load of the shop and the systems and methods herein denote it by N. Thus, RC=α/N, where α is a constant (assuming α=1) and it can be assigned an appropriate value based on the knowledge of dynamics of the shop. This is only a simplified model used to simplify illustration of the concepts disclosed herein and those ordinarily skilled in the art would realize that other more complex models are useful with the systems and methods herein, but this exemplary model is correlated to the job assignments and completions and hence provides valuable feedback about the state of each shop at regular intervals comparable to job inter-arrival periods.

With respect to an objective function ($U_j^s$), for every job, the systems and methods herein can rank the candidate shops with respect to an objective function ($U_j^s$) which combines cost and turnaround time. The job can then be routed to the highest rank shop, i.e., the shop with the lowest value of the objective function. This allows systems and methods herein to minimize cost and turnaround time. The systems and methods herein obtain the objective function by considering a weighted sum of normalized cost (weight w1) and normalized turnaround time (weight w2).

With respect to normalized cost (at shop s for job j), $NC_j^s$=cost of a shop/highest cost across the shops. With respect to normalized turnaround time (at shop s for job j), $NTAT_j^s$=turnaround time score (turnaround time of a shop/expected turnaround time for a job by the customer) of a shop/highest turnaround time score across the shops. This allows the objective function to be presented as:

$$U_j^s = w_1 * NC_j^s + w_2 * NTAT_j^s$$

With this exemplary objective function, the assumptions can include that each job is routed to only one shop and there is no splitting of the job, jobs are non-preemptive, metrics such as turnaround time, job lateness etc., are a monotonic function of job size, update intervals for residual capacity matrix are same as the job inter-arrival time intervals (i.e., update happens just before the routing decision), there is a single type of job, etc. Those ordinarily skilled in the art would understand that this is only an exemplary objective function, and that many other objective functions could be used with the systems and methods herein, as the heuristic presented here is for a large scale enterprise with a large number of production centers/shops spread geographically and large volume of jobs.

With respect to a job routing method, a job arrives at the enterprise central router with information on (job size ($S_j$), expected ($TAT_j$) or due date and customer location ($L_j$)). Cost information (operator/labor cost, equipment cost per unit size, lookup table for shipping cost based on proximity of customer location) for each shop is previously known.

The state of each shop (in terms of RC or load) is updated at each decision epoch and turnaround time for each job at each shop is computed based on the updated information, (i.e., using feedback variable RC). The cost of processing each job at each shop is computed using job information, such as size and cost information of a shop.

Then, the shops are ranked according to the objective function ($U_j^s$), i.e., the weighted sum of cost and turnaround time (normalized cost and turnaround time are obtained as described above). The shop with lowest $U_j^s$ is chosen as the optimal shop for routing job j. Without loss of generality, in one example, the systems and methods herein can consider $w_1+w_2=1$. The weights indicate emphasis on cost ($w_1=0.9$) or turnaround time ($w_2=0.9$) based on the customer requirement.

FIG. 1 is flowchart illustrating exemplary methods for processing and printing a print job. In item 100, these methods evaluate the most recent print job processed with different printing sites to calculate the current residual capacity for each of the different printing sites in item 102. The current residual capacity is calculated in item 102 based on the assignment time and the completion time of the most recent print job processed by each of the different printing sites. The current residual capacity is determined and maintained by a computerized server that is in communication with and separate from the different printing sites, and does not need to rely upon feedback from the different printing sites themselves.

Further, when evaluating the most recent print job processed with the different printing sites, the methods herein can calculate multiple current residual capacities in item 102 for each of the different printing sites to account for different sizes, types, and complexities of different most recent jobs processed by the different printing sites.

Such methods then receive a print job into the computerized server in item 104 after calculating the current residual capacity in item 102. These methods can then calculate a turnaround time of the print job for each of the different printing sites, based on the current residual capacity in item 106. The methods can also calculate the cost of the print job for each of the different printing sites in item 108 based on historical cost information maintained by the computerized server (and the historical cost information can be received periodically by the computerized server from the different printing sites). Then, the methods calculate a weighted sum of the turnaround time and the cost of the print job for each of the different printing sites in item 110.

In one example, the weighted sum can be calculated in item 110 by receiving preferences from users supplying the print job, and determining weighting factors based on the preferences. Thus, the user preferences can change weights of the weighted sum to permit "what-if" analyses, and the user (enterprise manager) can select weights by performing "what-if-analysis" (i.e., the user can interact with the systems and methods herein and try different values (what-if scenarios) before selecting one). Such methods thus apply the weighting factors to the turnaround time and the cost of the print job for each of the different printing sites to produce a weighted turnaround time and weighted cost of the print job for each of the different printing sites. Then, the weighted turnaround time and the weighted cost of the print job are summed for each of the different printing sites to generate the weighted sum of the turnaround time and the cost of the print job for each of the different printing sites.

This allows these methods to select one of the different printing sites based on which of the different printing sites has the relatively lowest weighted sum for the print job in item 112, and to assign the print job to the selected printing site in item 114 to cause the selected printing site to process the print job using specialized printing and finishing machines in item 116. Some methods herein can receive a required turnaround time for the print job, and this limits the selected printing site to one that has a turnaround time that meets the required turnaround time.

Figure 2:
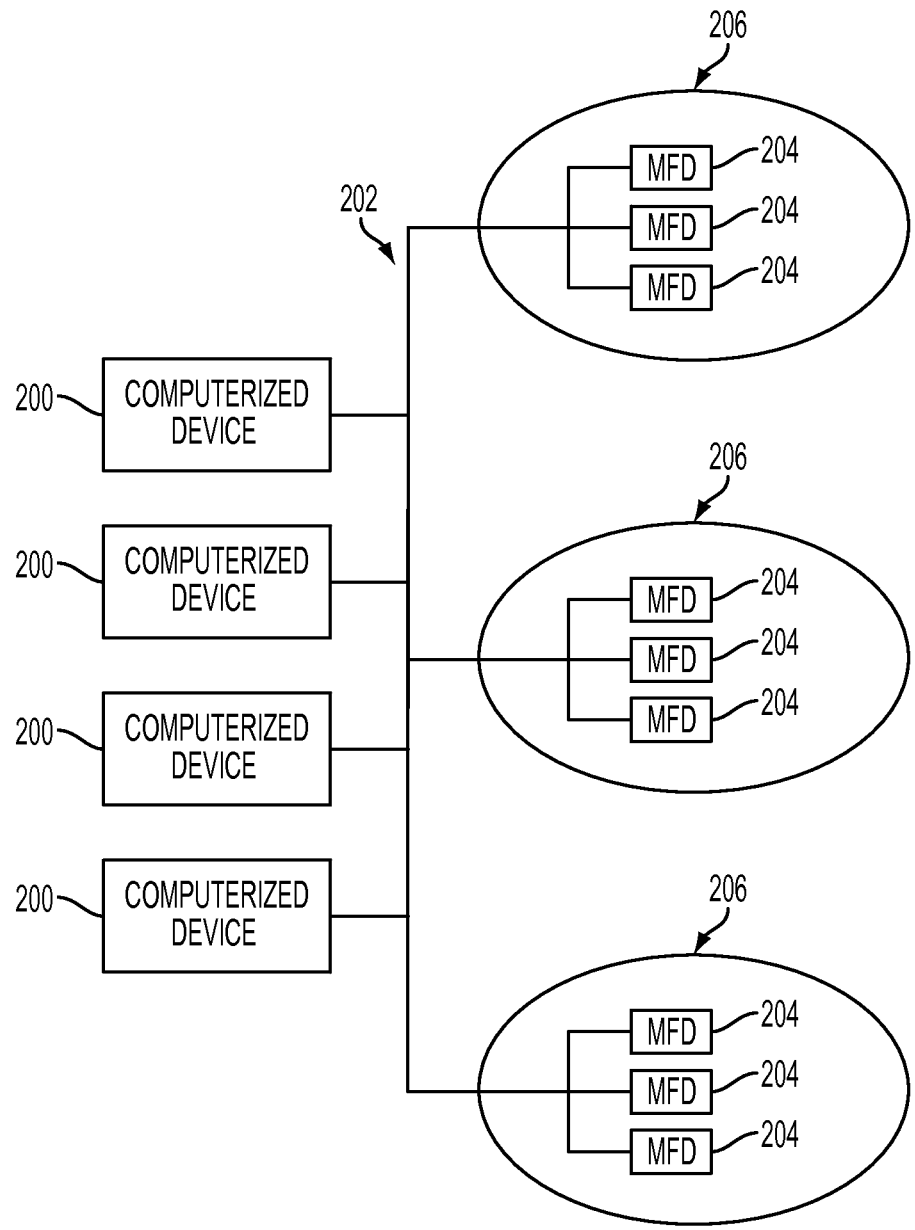
FIG. 2 is a schematic diagram illustrating systems herein.

As shown in FIG. 2, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 3:
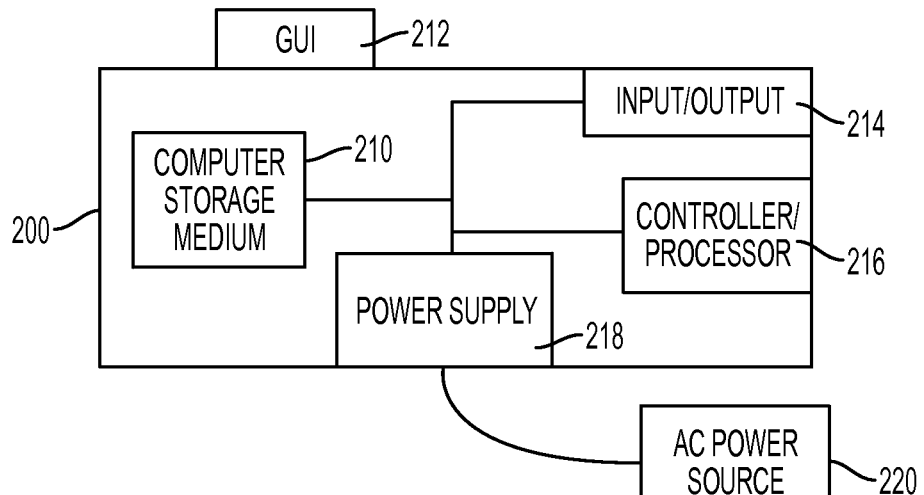
FIG. 3 is a schematic diagram illustrating devices herein.

FIG. 3 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 3, a body housing has one or more functional components that operate on power supplied from an alternating current (AC) source 220 by the power supply 218. The power supply 218 can comprise a common power conversion unit, power storage element (e.g., a battery, etc), etc.

Figure 4:
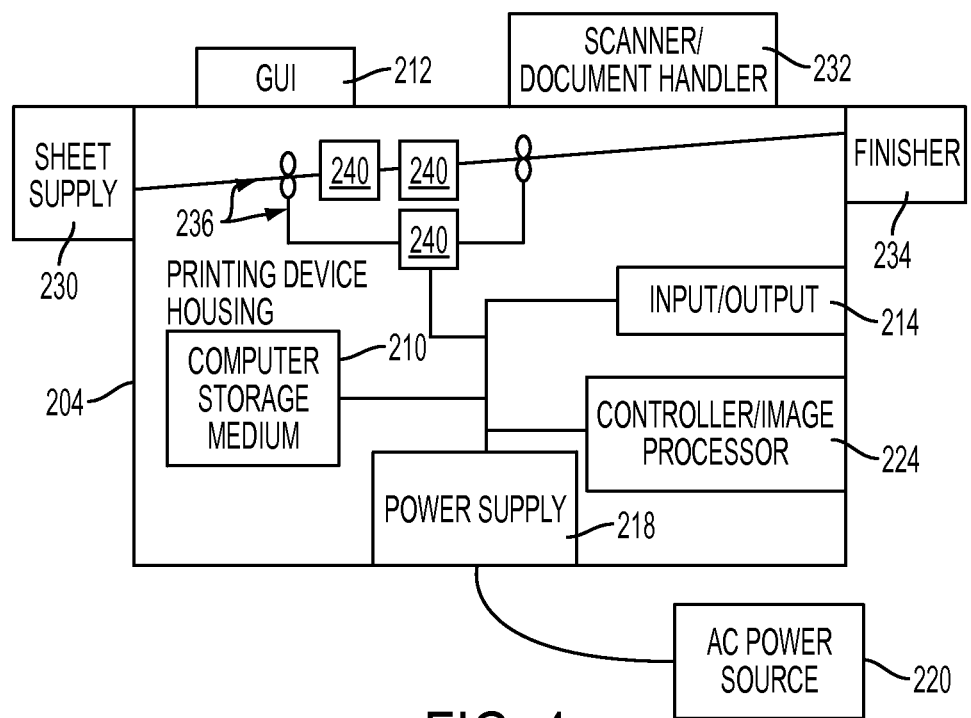
FIG. 4 is a schematic diagram illustrating devices herein.

FIG. 4 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Various systems for processing and printing a print job include a computerized server 200 in communication with different printing sites 206. The different printing sites 206 have specialized printing and finishing machines 204 located in separate locations and in locations that are separate from the computerized server 200. The computerized server 200 evaluates the most recent print job processed with the different printing sites 206 to calculate the current residual capacity for each of the different printing sites 206. The current residual capacity is based on the assignment time and the completion time of the most recent print job by the different printing site.

Further, when evaluating the most recent print job processed with the different printing sites 206, the computerized server 200 can calculate multiple current residual capacities for each of the different printing sites 206 to account for different sizes, types, and complexities of different most recent jobs processed by the different printing sites 206.

The computerized server 200 receives a print job after calculating the current residual capacity, and then calculates a turnaround time of the print job for each of the different printing sites 206 based on the current residual capacity. The computerized server 200 also calculates the cost of the print job for each of the different printing sites 206 based on historical cost information maintained by the computerized server 200. The computerized server 200 then calculates a weighted sum of the turnaround time and the cost of the print job for each of the different printing sites 206.

In one example, the weighted sum can be calculated by receiving preferences from users supplying the print job, and determining weighting factors based on the preferences. The computerized server 200 thus applies the weighting factors to the turnaround time and the cost of the print job for each of the different printing sites 206 to produce a weighted turnaround time and weighted cost of the print job for each of the different printing sites 206. Then, the weighted turnaround time and the weighted cost of the print job are summed for each of the different printing sites 206 to generate the weighted sum of the turnaround time and the cost of the print job for each of the different printing sites 206.

This allows the computerized server 200 to select the printing site having the relatively lowest weighted sum for the print job as the selected printing site. The computerized server 200 can also receive a required turnaround time for the print job, and limit the selected printing site to ones having a turnaround time that meets the required turnaround time. The computerized server 200 then assigns the print job to the selected printing site to cause the selected printing site to process the print job using the specialized printing and finishing machines 204.

As would be understood by those ordinarily skilled in the art, the printing device 204 shown in FIG. 4 is only one example and the systems and methods herein are equally applicable to other types of printing devices that may include fewer components or more components. For example, while a limited number of printing engines and paper paths are illustrated in FIG. 4, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, book-making machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method of processing and printing a print job comprising:
    evaluating a most recent print job processed with specialized printing and finishing machines located in different printing sites to calculate current residual capacity for each of said different printing sites, said current residual capacity being determined and maintained by a computerized server that is in communication with, and separate from, said different printing sites over a wide area network;
    receiving said print job into said computerized server;
    calculating a turnaround time of said print job for each of said different printing sites based on said current residual capacity;
    calculating a cost of said print job for each of said different printing sites based on historical cost information maintained by said computerized server;
    receiving user preferences from users supplying said print job;
    determining user-preference based weighting factors based on said user preferences;
    applying said user-preference based weighting factors to said turnaround time and said cost of said print job for each of said different printing sites to change said turnaround time and said cost of said print job into a weighted turnaround time and weighted cost of said print job for each of said different printing sites, said user preferences determining how said user-preference based weighting factors change said turnaround time and said cost of said print job when producing said weighted turnaround time and said weighted cost of said print job; and
    summing said weighted turnaround time and said weighted cost of said print job for each of said different printing sites to generate a weighted sum of said turnaround time and said cost of said print job for each of said different printing sites;
    receiving changes to said user preferences from said users;
    determining different weighting factors based on said changes to said user preferences;
    repeating said applying and said summing, using said different weighting factors;
    selecting one of said different printing sites as a selected printing site based on a relatively lowest weighted sum for said print job; and
    assigning said print job to said selected printing site over said wide area network to cause said selected printing site to process said print job using said specialized printing and finishing machines.

2. The method according to claim 1, said evaluating calculating multiple current residual capacities for each of said different printing sites to account for different sizes, types, and complexities of different most recent jobs processed by said different printing sites.

3. The method according to claim 1, further comprising receiving a required turnaround time for said print job,
    said selecting limiting said selected printing site to ones having said turnaround time that meets said required turnaround time.

4. A method of processing and printing a print job comprising:
    evaluating a most recent print job processed with specialized printing and finishing machines located in different printing sites to calculate current residual capacity for each of said different printing sites, said current residual capacity being based on an assignment time and a completion time of said most recent print job processed by said different printing sites, said current residual capacity being determined and maintained by a computerized server that is in communication with, and separate from, said different printing sites over a wide area network;
    receiving said print job into said computerized server after calculating said current residual capacity;
    calculating a turnaround time of said print job for each of said different printing sites based on said current residual capacity;
    calculating a cost of said print job for each of said different printing sites based on historical cost information maintained by said computerized server;
    receiving user preferences from users supplying said print job;
    determining user-preference based weighting factors based on said user preferences;
    applying said user-preference based weighting factors to said turnaround time and said cost of said print job for each of said different printing sites to change said turnaround time and said cost of said print job into a weighted turnaround time and weighted cost of said print job for each of said different printing sites, said user preferences determining how said user-preference based weighting factors change said turnaround time and said cost of said print job when producing said weighted turnaround time and said weighted cost of said print job; and
    summing said weighted turnaround time and said weighted cost of said print job for each of said different printing sites to generate a weighted sum of said turnaround time and said cost of said print job for each of said different printing sites;
    receiving changes to said user preferences from said users;
    determining different weighting factors based on said changes to said user preferences;
    repeating said applying and said summing, using said different weighting factors;
    selecting one of said different printing sites as a selected printing site based on a relatively lowest weighted sum for said print job; and assigning said print job to said selected printing site over said wide area network to cause said selected printing site to process said print job using said specialized printing and finishing machines.

5. The method according to claim 4, said evaluating calculating multiple current residual capacities for each of said different printing sites to account for different sizes, types, and complexities of different most recent jobs processed by said different printing sites.

6. The method according to claim 4, further comprising receiving a required turnaround time for said print job,
said selecting limiting said selected printing site to ones having said turnaround time that meets said required turnaround time.

7. The method according to claim 4, further comprising receiving, by said computerized server from said different printing sites, said historical cost information.

8. A system for processing and printing a print job comprising:
a computerized server in communication with different printing sites over a wide area network,
said different printing sites comprising specialized printing and finishing machines located in separate locations and in locations separate from said computerized server,
said computerized server evaluating a most recent print job processed with said specialized printing and finishing machines of said different printing sites using information obtained over said wide area network to calculate current residual capacity for each of said different printing sites,
said computerized server receiving said print job,
said computerized server calculating a turnaround time of said print job for each of said different printing sites based on said current residual capacity,
said computerized server calculating a cost of said print job for each of said different printing sites based on historical cost information maintained by said computerized server,
said computerized server receiving user preferences from users supplying said print job,
said computerized server determining user-preference based weighting factors based on said user preferences,
said computerized server applying said user-preference based weighting factors to said turnaround time and said cost of said print job for each of said different printing sites to change said turnaround time and said cost of said print job into a weighted turnaround time and weighted cost of said print job for each of said different printing sites,
said user preferences determining how said user-preference based weighting factors change said turnaround time and said cost of said print job when producing said weighted turnaround time and said weighted cost of said print job,
said computerized server summing said weighted turnaround time and said weighted cost of said print job for each of said different printing sites to generate a weighted sum of said turnaround time and said cost of said print job for each of said different printing sites,
said computerized server receiving changes to said user preferences from said users,
said computerized server determining different weighting factors based on said changes to said user preferences,
said computerized server repeating said applying and said summing, using said different weighting factors,
said computerized server selecting one of said different printing sites as a selected printing site based on a relatively lowest weighted sum for said print job, and
said computerized server assigning said print job to said selected printing site over said wide area network to cause said selected printing site to process said print job using said specialized printing and finishing machines.

9. The system according to claim 8, said computerized server evaluating a most recent print job by calculating multiple current residual capacities for each of said different printing sites to account for different sizes, types, and complexities of different most recent jobs processed by said different printing sites.

10. The system according to claim 8, said computerized server receiving a required turnaround time for said print job,
said computerized server limiting said selected printing site to ones having said turnaround time that meets said required turnaround time.

11. The system according to claim 8, said computerized server receiving said historical cost information from said different printing sites.

12. A system for processing and printing a print job comprising:
a computerized server in communication with different printing sites over a wide area network,
said different printing sites comprising specialized printing and finishing machines located in separate locations and in locations separate from said computerized server,
said computerized server evaluating a most recent print job processed with said specialized printing and finishing machines of said different printing sites using information obtained over said wide area network to calculate current residual capacity for each of said different printing sites,
said current residual capacity being based on an assignment time and a completion time of said most recent print job processed by said different printing sites,
said computerized server receiving said print job after calculating said current residual capacity,
said computerized server calculating a turnaround time of said print job for each of said different printing sites based on said current residual capacity,
said computerized server calculating a cost of said print job for each of said different printing sites based on historical cost information maintained by said computerized server,
said computerized server receiving user preferences from users supplying said print job,
said computerized server determining user-preference based weighting factors based on said user preferences,
said computerized server applying said user-preference based weighting factors to said turnaround time and said cost of said print job for each of said different printing sites to change said turnaround time and said cost of said print job into a weighted turnaround time and weighted cost of said print job for each of said different printing sites,
said user preferences determining how said user-preference based weighting factors change said turnaround time and said cost of said print job when producing said weighted turnaround time and said weighted cost of said print job,
said computerized server summing said weighted turnaround time and said weighted cost of said print job for each of said different printing sites to generate a weighted sum of said turnaround time and said cost of said print job for each of said different printing sites, said computerized server receiving changes to said user preferences from said users, said computerized server determining different weighting factors based on said changes to said user preferences, said computerized server repeating said applying and said summing, using said different weighting factors, said computerized server selecting one of said different printing sites as a selected printing site based on a relatively lowest weighted sum for said print job, and said computerized server assigning said print job to said selected printing site over said wide area network to cause said selected printing site to process said print job using said specialized printing and finishing machines.

13. The system according to claim 12, said computerized server evaluating a most recent print job by calculating multiple current residual capacities for each of said different printing sites to account for different sizes, types, and complexities of different most recent jobs processed by said different printing sites.

14. The system according to claim 12, said computerized server receiving a required turnaround time for said print job, said computerized server limiting said selected printing site to ones having said turnaround time that meets said required turnaround time.

15. The system according to claim 12, said computerized server receiving said historical cost information from said different printing sites.

* * * * *